Figure 1:
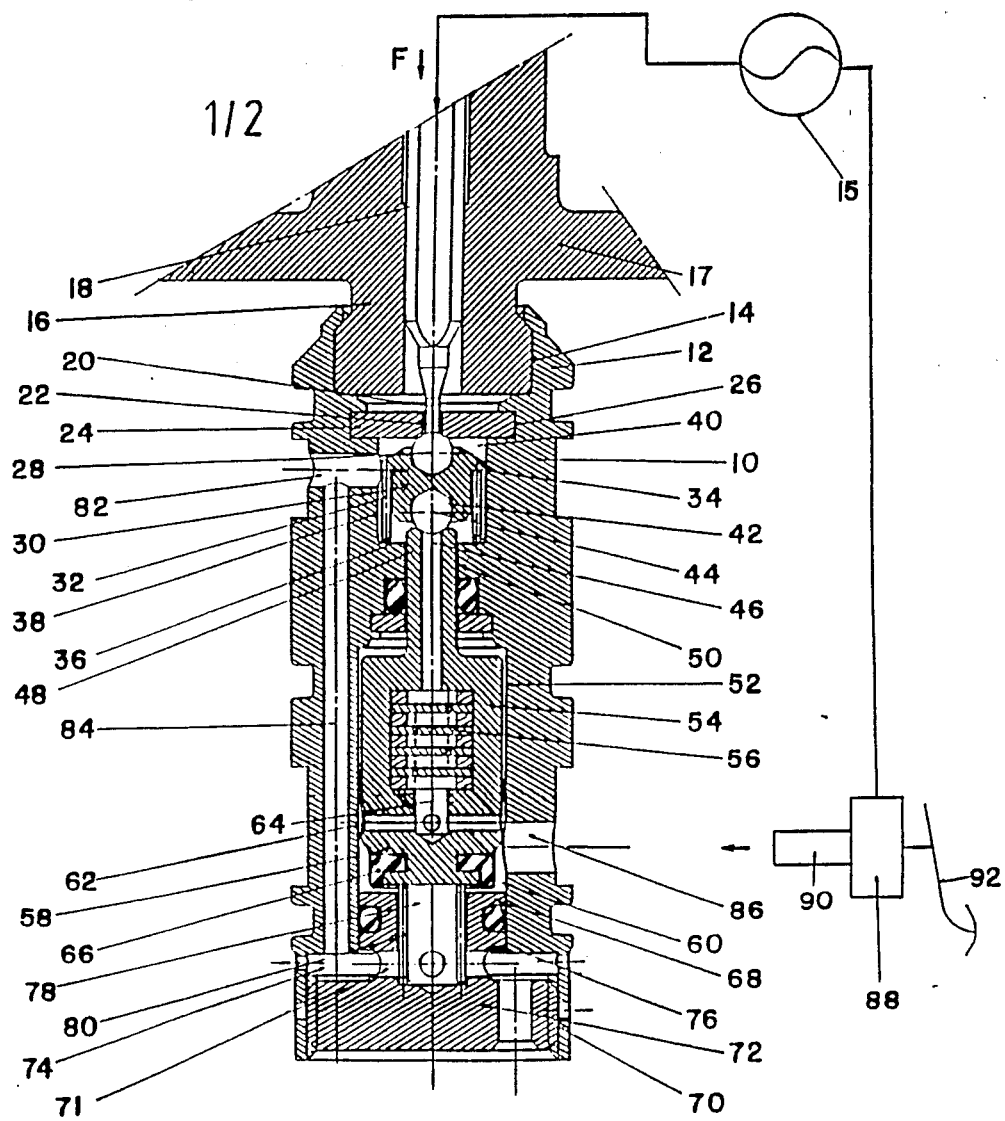

United States Patent [19]
Gilbert et al.

[11] Patent Number: 4,936,344
[45] Date of Patent: Jun. 26, 1990

[54] PILOT-CONTROLLED VALVE FOR A WHEEL ANTI-LOCK SYSTEM

[75] Inventors: Kervagoret Gilbert, Argenteuil; Vincent Clapeau, Paris; Jean-Luc Guesdon, Rosny Sous Bois; Jean-Marc Parquet, Montmorency, all of France

[73] Assignee: Bendix France, Drancy, France

[21] Appl. No.: 349,363

[22] Filed: May 9, 1989

[30] Foreign Application Priority Data

| May 10, 1988 [FR] | France | 88 06265 |
| Jul. 22, 1988 [FR] | France | 88 09909 |

[51] Int. Cl.$^5$ ............................................ F15B 13/044
[52] U.S. Cl. .................................. 137/596.17; 303/119
[58] Field of Search ....................... 137/596.17; 303/119

[56] References Cited

U.S. PATENT DOCUMENTS

| 4,620,565 | 11/1986 | Brown | 137/596.17 |
| 4,790,351 | 12/1988 | Kervagoret | 137/596.17 |
| 4,844,119 | 7/1989 | Martinic | 137/596.17 |

FOREIGN PATENT DOCUMENTS

| 0065451 | 11/1982 | European Pat. Off. . |
| 0215272 | 3/1987 | European Pat. Off. . |
| 1780069 | 3/1972 | Fed. Rep. of Germany . |
| 3427802 | 9/1977 | Fed. Rep. of Germany . |
| 2710067 | 2/1985 | Fed. Rep. of Germany . |
| 80/01783 | 9/1980 | PCT Int'l Appl. . |

Primary Examiner—Gerald A. Michalsky
Attorney, Agent, or Firm—Larry J. Palguta; Ken C. Decker

[57] ABSTRACT

The invention relates to a pilot-controlled valve, especially for an anti-skid brake system, this system comprising at least one pressurized-fluid source (90, 115) and at least one pressure receiver, the valve comprising at least one pressurized-fluid inlet (86, 132) and comprising a piston mechanism (54, 114), sliding sealingly in a bore (52) and movable between a rest position and an active position under the effect of an actuating mechanism (17, 18), in order to control an isolating shutter (58, 66) between at least one of the pressurized-fluid sources (90, 115) and at least of the pressure receivers, and a discharge shutter (28) between at least one of the pressure receivers and a reservoir (15), the anti-skid brake system comprising a backfeed circuit including a flow restrictor between at least one of the pressurized-fluid sources (90, 115) and at least one of the pressure receivers. According to the invention, the piston mechanism (54) contains at least one flow restrictor (56, 126) to ensure that the entire backfeed circuit is contained in the piston mechanism (54), the pilot-controlled valve also processing a backfeed shutter (44).

5 Claims, 2 Drawing Sheets

PILOT-CONTROLLED VALVE FOR A WHEEL ANTI-LOCK SYSTEM

The subject of the present invention is a pilot-controlled valve intended, more particularly, to be inserted in a hydraulic brake circuit for a motor vehicle between a brake booster and the wheel cylinders in a wheel anti-lock system.

The document EP-B-0,065,451 makes known a brake modulator for an anti-skid braking system with backfeed, of the type comprising an isolating valve arranged between a conduit intended to be connected to a brake-pressure source and an outlet conduit intended to be connected to a brake motor, a discharge valve arranged between the outlet conduit and a reservoir, a backfeed circuit including a flow restriction, and a control solenoid equipped with an actuating member, the isolating and discharge valves having their respective shutters movable along a common axis and their respective seats in opposition, the actuating member of the solenoid being coupled to the movable shutter of the discharge valve, which shutter is couplable mechanically to the movable shutter of the isolating valve by means of a connecting member sliding in a bore, in order to move the latter towards its own seat, counter to an elastic restoring means, when the control solenoid is actuated.

According to this document, the movable shutter of the isolating valve has a cylinder part forming the connecting member and internally defining a conduit portion of the backfeed circuit opening laterally into the bore, this conduit portion opening into the axial end of the cylindrical part interacting with the movable shutter of the discharge valve and being closable by the latter, the cross-section of the cylindrical part being smaller than the cross-section of the seat of the movable shutter of the isolating valve.

These various components are inserted in the hydraulic brake circuit and connected to one another by means of multiple pipelines, thus giving rise to the disadvantages of a relatively large bulk of the complete anti-lock system, relatively complex assembly and a somewhat high cost.

In other cases, because of the functioning of the wheel anti-lock system where pressure-increase phases and pressure-reduction phases succeed one another quickly, the hydraulic system as a whole is subjected to vibrations which can become considerable and be detrimental to the lifetime of the system. At the end of the circuit, these vibrations are also transmitted to the brake pedal and are felt by the vehicle driver, and this can give him a surprise which is sometimes very unpleasant and disturb his braking action.

Furthermore, quite apart from the functioning in the anti-lock mode, under the effect of a violent pedal stroke the movable shutter of the isolating valve can be driven by the brake fluid and closed. This phenomenon is known as "dynamic choking" of the shutter. The brake fluid is then forced to pass via the backfeed circuit. The pressure increase in the wheel cylinders is thus transmitted by way of a restriction, braking is thereby slowed and the result obtained is contrary to that aimed for by the initial violent pedal stroke.

It is therefore an object of the invention to provide a device which, in the hydraulic brake circuits of vehicles equipped with a wheel anti-lock system, replaces the various components by a single compact assembly of reduced bulk, easy manufacture and moderate cost.

According to the present invention, there is provided a pilot-controlled valve, especially for an anti-skid braking system, this system comprising at least one pressurized-fluid source and at least one pressure receiver, the valve comprising a piston means sliding sealingly in a bore and movable between a rest position and an active position under the effect of an actuating means, in order to control an isolating shutter between at least one of the pressurized-fluid sources and at least one of the pressure receivers, and a discharge shutter between at least one of the pressure receivers and a reservoir, the anti-skid brake system comprising a backfeed circuit including a flow restrictor between at least one of the pressurized-fluid sources and at least one of the pressure receivers, the pilot-controlled valve being characterized in that the piston means contains at least one flow restrictor to ensure that the entire backfeed circuit is contained in this piston means, the pilot-controlled valve also possessing a backfeed shutter at one of the ends of the backfeed circuit.

Another object of the invention is to provide such a device which does not transmit the vibrations generated as a result of the functioning of the anti-lock system to the brake pedal.

According to the present invention, there is provided such a valve which has two pressurized-fluid inlets and in which the piston means contains a second flow restrictor which, when the piston means is in its active position, is inserted in the circuit between the two pressurized-fluid inlets.

Yet another object of the invention is to ensure that the device provided is not subject to the phenomenon of dynamic choking of the isolating shutter.

According to the present invention, there is provided such a valve in which the isolating shutter is constituted by the head of the piston means, this shutter having a diameter smaller than that of the bore in which the piston means slides, the shutter defining with this bore a chamber communicating with one of the pressurized fluid sources.

Figure 2:
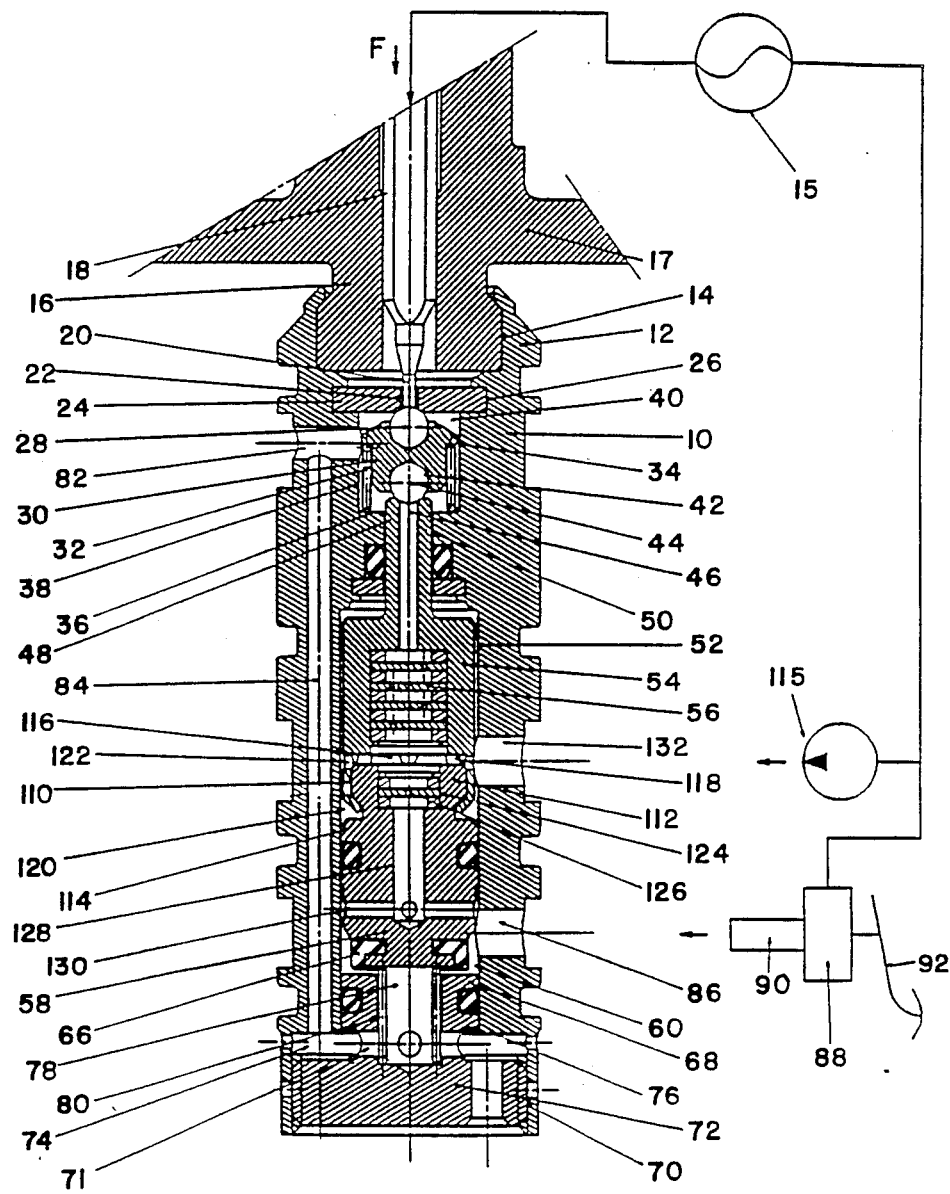

The invention will now be described by way of example with reference to the accompanying drawing in which:

FIG. 1 is a view in longitudinal section of a first embodiment of a pilot-controlled valve according to the invention, and FIG. 2 is a view in longitudinal section of a second embodiment of a pilot-controlled valve according to the invention.

Referring to FIG. 1, the pilot-controlled valve according to the invention consists of a body 10 of general cylindrical form, one of the ends 12 of which is equipped with a bore 14 intended for crimping the body 10 onto the base 16 of an electromagnet 17 (not shown) which, under the control of a computer (not shown), actuates a tappet 18. This tappet 18 is equipped, at its end, with a rod 20 entering a duct 22 in a piece 24 crimped in a bore 26 of the same axis as the bore 14. This piece 24 forms the seat of a ball shutter 28 fixed to a guide 30 of a restoring spring 32. This restoring spring 32 is arranged between a shoulder 34 of the spring guide 30 and the bottom 36 of a bore 38 coaxial relative to the preceding ones and, in the rest position shown, keeps the ball of the shutter 28 pressed against its seat, thus preventing any communication between the duct 22 and the chamber 40 defined by the bore 38.

The guide 30 is equipped, at its other end, with a blind bore 42 which receives a second ball 44. This ball 44 forms a shutter with the end of a duct 46 made in a rod 48 and forming the seat of the shutter for the ball 44. This rod 48 can slide sealingly in a bore 50 coaxial relative to the preceding ones. The bore 50 opens into another bore 52, in which a hollow piston 54 can slide with some play. The rod 48 is crimped in or is integral with the hollow piston 54 which contains a flow restrictor 56. The piston 54 has a stepped form, its head 58 having a diameter smaller than that of the bore 52 and defining with the latter a second chamber 60.

In the head 58 of the hollow piston 54 there is a diametral duct 62, into which an axial duct 64 opens, these two ducts ensuring communication between the chamber 60, the interior of the body of the hollow piston and, via the restriction 56, the duct 46 in the rod 48. Furthermore, the head 58 of the hollow piston is shaped to receive a piece 66 of elastomeric material, forming a third shutter with the head 68 of a piece 72 located at the end of the bore 52. The latter opens into a bore 70 made at the end of the body 10 and closed by means of the piece 72 forming a plug, so as to provide a space 74 between it and the bottom 76 of the bore 70. The plug 72 has a blind duct 78, the entrance of which forms the shutter seat for the piece 66 and the bottom of which is a support for a restoring spring 80 normally pressing the piece 66 of the third shutter out of its seat. The head 68 of the plug 72 is equipped with a diametral duct 71 putting the space 74 in communication with the interior of the blind duct 78.

A duct 82 is made in the body 10 and opens into the chamber 40 in order to put it in communication with the wheel cylinders (not shown). Another duct 84 is made in the body 10 in parallel with its axis and puts the duct 82 in communication with the space 74. A third duct 86 is also made in the body 10 and opens into the chamber 60, in order to put it in communication, via a pipeline (not shown), with a pressurized-fluid source consisting, in the example illustrated, of a master cylinder 90 controlled by a brake booster 88, the assembly as a whole being controlled by the driver by means of a pedal 92.

The device thus described functions as follows. During a normal braking phase, when the driver has pressed the brake pedal 92, the pressure of the brake fluid in the master cylinder 90 increases, and this pressure increase is transmitted, via pipeline (not shown), to the duct 86 and to the chamber 60. If the spring 80 moves the piece 66 away from its seat, the third shutter is opened and the pressure increase is transmitted to the wheel cylinders by means of the space 74 and the ducts 84 and 82.

As mentioned above, the head 58 of the piston 54 located in the chamber 60 has a diameter smaller than that of the bore 52 in which the piston 54 slides. The result of this is that, during this operating phase outside an anti-lock period, this arrangement makes it possible to prevent the head 58 of the piston 54 from being driven by the brake fluid under the effect of a violent pedal stroke and at the same time closing the third shutter, this phenomenon being known as "dynamic choking".

In fact, if this third shutter closed as a result of dynamic choking, the result would be that the pressure increase would then be transmitted to the wheel cylinders via the ducts 62 and 64, the restriction 56, the duct 46, the chamber 40 after the lifting of the ball 44 under the effect of the pressure increase, and the duct 82. The brake fluid would thus be forced to pass via the flow restrictor 56, braking would be slowed and the result obtained would be contrary to that aimed for by the initial violent pedal stroke.

The pilot-controlled valve according to the invention is inserted in a brake circuit and is controlled by a wheel anti-lock device. This device comprises a computer (not shown) which controls the current in the electromagnet 17 and consequently the position of the tappet 18. When the computer detects this imminent locking of the wheels, it controls the movement of the tappet 18 in the direction of the arrow F in FIG. 1. The tappet 18 then, in its movement, drives the rod 20 and the ball 28, moving it away from its seat counter to the action of the spring 32 and opening the first shutter or discharge shutter. The ball 28 in turn pushes the guide 30, the ball 44, the hollow rod 48 and the piston 54, the head 58 of which lays the piece 66 against the piece 68, thus closing the third shutter or isolating shutter counter to the action of the spring 80. The pressure generated by the master cylinder 90 therefore can no longer be transmitted to the brakes, since the second and third shutters are closed. In contrast, the first shutter being opened, the pressure prevailing in the wheel cylinders falls since they are then in communication with a low-pressure reservoir 15 known per se via the duct 82, the chamber 40, the duct 22 and the hollow tappet 18. The locking of the vehicle wheels is thus prevented.

It should be noted that, during this expansion phase, there is no loss of brake fluid from the pressure source 90 towards the low-pressure accumulator via the hollow piston 54 and the restrictor 56 which it contains, since the second shutter is closed.

When the computer detects the disappearance of the tendency of the wheel to lock, it commands the de-energization of the electromagnet 17, the tappet 18 then returning to its rest position in the opposite direction to that of the arrow F in the FIG. 1. The discharge shutter then recloses under the action of the spring 32. The ball 44 becomes free and opens the second shutter or backfeed shutter. The pressure prevailing in the master cylinder 90 is thus transmitted to the wheel cylinders via the duct 86, the chamber 60, the ducts 62 and 64, the restrictor 56, the duct 46, the chamber 40 and the duct 82. The effect of the restrictor 56 is then to moderate the rise in pressure of the fluid in the brake circuit. During this pressure-increase phase, the piston 54 is subjected, at any moment, on the one hand on its face carrying the rod 48, to the pressure generated by the master cylinder 90 as a result of the play provided between the piston 54 and the bore 52, and, on the other hand, on the face carrying the piece 66 of the isolating shutter, to the pressure prevailing in the wheel cylinders via the ducts 82 and 84 and the space 74, this pressure having been moderated by the restrictor 56 and therefore being below the pressure exerted on the other face of the piston. It will thus be seen that, as result of this pressure difference, the isolating shutter remains closed during this entire pressure-increase phase, allowing the feeding of the wheel cylinders only by way of the flow restrictor 56, the backfeed shutter being open.

If the computer once again detects the imminent locking of the wheels, it will then command a new expansion phase identical to the preceding one, except that, at the start of this second expansion, the isolating shutter is already closed, and the force to be supplied by the rod 18 in order to open the discharge shutter and close the backfeed shutter has to overcome only the resistance of the spring 32.

This expansion phase will be followed, in turn, by a pressure increase phase identical to the preceding one, and so on and so forth either until the complete stopping of the vehicle or until the driver ceases pressing on the pedal 92. At this moment, the pressures on the two faces of the piston 54 become equal, and the isolating shutter can open under the action of the spring 80. The pilot-controlled valve thus returns to its initial rest position. The brake fluid can then return to the master cylinder via the ducts 82 and 84, the space 74, the chamber 60 and the duct 86.

According to the invention, there is thus provided a pilot-controlled valve of reduced bulk and reduced costs, since it includes the entire backfeed circuit, and of reliable functioning. Furthermore, this valve is not subject to the phenomenon of dynamic choking because or the respective dimensions of the head of the piston and of the bore in which it slides.

FIG. 2 illustrates a second embodiment of a pilot-controlled valve according to the invention which can be used, for example, in anti-skid brake systems having an additional source of fluid under high pressure. In this Figure, the elements identical or similar to those of the preceding embodiment are identified by the same reference numerals.

The embodiment illustrated in FIG. 2 differs from the preceding embodiment in that in the head of the hollow piston 54 is made a bore 110 intended for receiving the part 112 of reduced diameter of a second stepped piston 114 which itself slides sealingly in the bore 52. The head 58 of the piston 54 is crimped round the part 112 of the piston 114, so as to provide a space 116 between the end of the part 112 and the bottom of the bore 110 by means of spaces 118 and also so as to provide another space 120 between these and the bore 52. The space 116 communicates with the space 120 by means of ports 122 made in the head of the piston.

In the piston 114 is a blind stepped bore, of which the part of larger diameter 124 facing the piston 54 receives a flow restrictor 126, and of which the blind part of smaller diameter 128 opens into a diametral duct 130 made in a third part of the piston 114 of a diameter smaller than that of the bore 52 and defining with the latter a space 60.

The head 58 of the piston 114 is identical to the head 58 of the piston 54 of the embodiment of FIG. 1 and performs exactly the same function, forming a third shutter or isolating shutter with the head 68 of a piece 72 located at the end of the bore 52.

The ducts 82, 84 and 86 are identical to those of the preceding embodiment, and an additional duct 132 is made in the body 10 and opens into the chamber 120 in order to put it into communication, via a pipeline (not shown), with a source of brake fluid under high pressure, such as a high pressure pump 115.

The device so described functions as follows. During a normal braking phase, when the driver has pressed on the brake pedal 92, the pressure of the brake fluid in the master cylinder 90 increases, and this pressure increase is transmitted to the duct 86 and to the chamber 60 via a pipeline (not shown). Since the spring 80 moves the piece 66 away from its seat, the isolating shutter is opened and the pressure increase is transmitted to the wheel cylinders by way of the spaces 78 and 74 and the ducts 84 and 82.

The hydraulic circuit comprising the duct 130, the bore 128, the restriction 126, the space 116 and the ducts 122 and 132 is connected to the outlet of the high-pressure pump 115 which is inactive in this normal braking phase. Consequently, the pressure increase in this latter circuit has no influence on the functioning of the pilot-controlled valve in this normal braking phase.

As before, the respective dimensions of the head 58 of the piston 114 and of the bore 52 make it possible to prevent the phenomenon of dynamic choking of the isolating shutter.

When a computer detects the imminent locking of the wheels, it commands the movement of the tappet 18 in the direction of the arrow F in FIG. 2. The tappet 18 then, in its movement, drives the rod 20 and the ball 28, moving it away from its seat counter to the action of the spring 32 and opening the discharge shutter. The ball 28 in turn pushes the guide 30, the ball 44, the hollow rod 48, the piston 54 and the piston 114, the head 58 of which lays the piece 66 against the piece 68, thus closing the isolating shutter counter to the action of the spring 80. Since the discharge shutter is open, the pressure prevailing in the wheel cylinders falls since they are then in communication with a low-pressure reservoir 15 via the duct 82, the chamber 40, the duct 22 and the hollow tappet 18. In this braking phase, called the expansion phase, the high-pressure pump 115 is simultaneously actuated under the control of the computer and delivers to the circuit formed by the ducts 132 and 122, the space 116, the restriction 126, the bore 128, the duct 130 and the space 60, thereby counterbalancing the pressure generated by the master cylinder 90 smoothly as a result of the restriction 126. The pressure in the hydraulic circuit between the duct 86 and the master cylinder 90 thus remains substantially constant, and, with the isolating and backfeed shutters being closed, the pressure generated by the master cylinder 90 or by the pump 115 cannot be transmitted to the brakes. The locking of the vehicle wheels is thus prevented without any abrupt pressure variation in this hydraulic circuit and therefore without any reaction on the brake pedal 92.

When the computer detects the disappearance of the tendency of the wheel to lock, it then commands the de-energization of the electromagnet 17, and the tappet 18 returns to the rest position in the opposite direction to that of the arrow F in FIG. 2. The discharge shutter then recloses under the action of the spring 32. The ball 44 becomes free and opens the backfeed shutter. The pressure generated by the pump 115 is thus transmitted to the wheel cylinders via the ducts 132 and 122, the chamber 116, the restrictor 56, the duct 46, the chamber 40 and the duct 82. The effect of the restrictor 56 is to moderate the rise in pressure of the fluid in the brake circuit.

During this pressure-increase phase, on the one hand the piston 54 is subjected at any moment, on the side nearest the backfeed shutter, to the pressure P1 generated by the high-pressure pump 115, on the other hand the piston 114 is subjected, on the side nearest the isolating shutter, to the pressure P2 prevailing in the wheel brakes and below the pressure P1. Since the two pistons 54 and 114 are firmly secured, the assembly as a whole is urged in the direction of the arrow F, that is to say in the direction of closure of the isolating shutter and of opening of the backfeed shutter. The moderated pressure-increase phase can therefore proceed normally.

During this pressure-increase phase, the pressure generated by the high-pressure pump 115 is likewise transmitted to the duct 86 and to the master cylinder 90 via the restriction 126 and the duct 128. The effect of the presence of the restriction 126 is likewise to moderate the increase in pressure in the circuit leading to the master cylinder.

If the computer once again detects the imminent locking of the wheels, it will then command a new expansion phase identical to the preceding one, except that, at the start of this second expansion, the isolating shutter is already closed, and the force to be supplied by the rod 18 in order to open the discharge shutter and close the backfeed shutter has to overcome only the resistance of the spring 32.

This expansion phase will be followed, in turn, by a pressure-increase phase identical to the preceding one, and so on and so forth, either until the complete stopping of the vehicle or until the driver ceases pressing on the pedal 92. At this moment, the computer commands the de-energization of the electromagnet 17 and of the pump 115. The pressures in the hydraulic circuit as a whole tend to become uniform, thus causing the opening of the isolating shutter and consequently the closing of the discharge and backfeed shutters. The pilot-controlled valve thus returns to its initial rest position, and the brake fluid contained in the wheel cylinders can return to the master cylinder 90 and the reservoir 15 via the ducts 82, 84 and 74, the spaces 78 and 60 and the duct 86.

According to the invention, there is thus provided a compact pilot-controlled valve of reduced bulk and of reliable functioning. Furthermore, the hydraulic pressure variations generated as a result of the rapid succession of expansion and pressure-increase phases are indeed transmitted to the wheel cylinders downstream of the valve, but are filtered and smoothed towards the master cylinder upstream of the valve as a result of the action of the flow restrictor 126 in the circuit located between the high-pressure pump and the master cylinder.

Of course, the invention is not limited to the embodiment just described by way of example, but on the contrary embraces all the alternative versions which a person skilled in the art may give it.

We claim:

1. A pilot-controlled valve, especially for an anti-skid brake system comprising at least one pressurized-fluid source and at least one pressure receiver, the valve comprising at least one pressurized-fluid inlet and comprising a piston means sliding sealingly in a bore and movable between a rest position and an active position under the effect of an actuating means, in order to control an isolating shutter between at least one of the pressurized-fluid sources and at least one of the pressure receivers, and a discharge shutter between at least one of the pressure receivers and a reservoir, the anti skid brake system comprising a backfeed circuit including one flow restrictor between at least one of the pressurized-fluid sources and at least one of the pressure receivers, said piston means containing at least one flow restrictor to ensure that the entire backfeed circuit is contained in the piston means, the pilot-controlled valve also including a backfeed shutter.

2. Valve according to claim 1, wherein the piston means is firmly secured to one end of a hollow rod, the other end of which forms the seat of the backfeed shutter.

3. Valve according to claim 1, wherein are further including two pressurized-fluid inlets, and a second flow restrictor which, when the piston means is in the active position, is inserted in the circuit between the two pressurized-fluid inlets.

4. Valve according to claim 3, wherein the two flow restrictors are separated by a space in direct communication with one of the pressurized-fluid inlets.

5. Valve according to claim 1, wherein the isolating shutter is constituted by a head of the piston means, and the shutter has a diameter smaller than that of the bore in which the piston means slides, the shutter defining with the bore a chamber communicating with one of the pressurized-fluid sources.

* * * * *